3,405,077
PROCESS FOR MAKING SOFT POLYURETHANE
FOAMS AND PRODUCT
Arthur J. Pastor, Lake Jackson, Lamar E. Peterson, Angleton, and Charles D. Price and Donnell A. Ballard, Lake Jackson, Tex., assignors to The Dow Chemical Company, Midland, Mich., a corporation of Delaware
No Drawing. Filed Dec. 31, 1964, Ser. No. 422,525
2 Claims. (Cl. 260—2.5)

ABSTRACT OF THE DISCLOSURE

A process for making a soft, flexible polyurethane foam, which process comprises reacting (1) a polyether polyol that is the condensate of propylene oxide and glycerine, which polyether polyol has an OH equivalent weight of from 800 to 1500 in admixture with (A) from 1.8 to 5 parts by weight of water per 100 parts by weight of said polyether polyol, and (B) a compound selected from the group consisting of alkyl ethers of ethylene glycol, propylene glycol, hexane triol and trimethylolpropane, which ethers have at least one hydroxyl group in the molecule and have an OH equivalent weight of from 74 to 150 and are used in amount corresponding to from 0.01 to 0.90 hydroxyl equivalent per chemical equivalent of water, with (2) a polyisocyanate in amount of from about 1 to 1.15 chemically equivalent NCO group for each reactive hydrogen in the mixture of ingredients.

---

This invention relates to flexible polyether urethane foams and more particularly relates to a process for making unusually soft, flexible, porous polyurethane foams. Flexible polyurethane foams are commonly prepared by reacting a polyisocyanate and a polyether polyol in admixture with water and a volatile alkane, alkene or halogenated alkane, e.g. dichlorodifluoromethane, as blowing agent. While such foams are useful for a variety of purposes, they frequently are not as flexible or soft as desired.

It has now been found that polyether urethane foams of improved softness, flexibility, and hand, can readily be prepared by incorporating into the polyether polyol recipe a small amount of water, in the range of from about 1.8 to 5 parts by weight of water per 100 parts by weight of the polyol, and a mono-, di- or trihydric alcohol having an OH equivalent weight of from 74 to 150, in amount corresponding to from 0.01 to 0.90 hydroxyl (OH) equivalent per chemical equivalent of water, and reacting said materials with a polyisocyanate in excess of that theoretically required to react with the reactive hydrogens in said mixture in admixture with a volatile alkane, alkene or halogenated alkane, as blowing agent.

Any of the polyether polyols commonly used for making flexible polyurethane foams can be used in practice of the invention. Suitable polyether polyols are the condensates of propylene oxide with polyhydric compounds having from 3 to 8 hydroxyl groups, or condensates of mixtures of ethylene oxide and propylene oxide with said polyhydric compounds, or condensates of alternatively ethylene oxide and propylene oxide in any order, wherein the ethylene oxide moieties constitute from about 8 to 20 percent of the total oxyalkylene groups in the polyether polyol with the proviso that said polyether polyols each have an OH equivalent weight of from 800 to 1500. Specific polyhydric compounds that are suitable as starting materials for making the condensates are glycerol, trimethylolpropane, pentaerythritol, hexanetriol, hexitol, heptitol, sorbitol, mannitol, sucrose and mixtures of two or more of such compounds.

The mono-, di- or trihydroxy compound, e.g. alcohol, glycol, glycol ether, glycerol or glycerol mono- or diether, having an OH equivalent weight of from 74 to 150 can be amyl alcohol, hexyl alcohol, heptyl alcohol, octyl alcohol, nonyl alcohol, ethylene glycol, propylene glycol, butylene glycol, methyl, ethyl, propyl, butyl and amyl monoethers of ethylene glycol or propylene glycol, hexane triol, glycerine, trimethylolpropane and mono- or di-, methyl, ethyl propyl or butyl ethers of said triols.

The polyisocyanates to be employed are those having two, three or more NCO groups. Examples of suitable polyisocyanates are hexamethylene diisocyanate, tolylene 2,4- or tolylene 2,6-diisocyanate, diphenyl methane diisocyanate, p,p-metaphenyl diisocyanate, p-phenylene diisocyanate, naphthalene diisocyanate, dimethyl diphenylmethane diisocyanate, dianisidine diisocyanate and "Papi," polymethylene polyphenylisocyanate, having the general formula

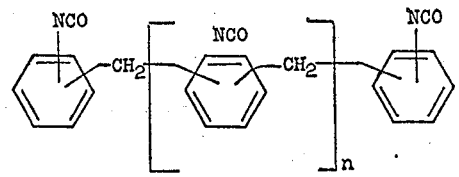

wherein $n$ has an average value of about 1, or mixtures of any two or more of such polyisocyanates. The isocyanate is employed in amount corresponding to at least about a chemically equivalent proportion to react with the total OH groups in the mixture of both the polyether polyol, the hydroxyl-containing compound and the water initially used, preferably in amount corresponding to from about 1 to 1.15 NCO group per chemically equivalent OH group in both the water and the polyether polyol employed. In this reaction the chemical equivalent weight of water is 9.

The polyether urethan foams of the invention are prepared in usual ways employing as the reactants the polyisocyanate and the polyether polyol, the hydroxyl containing compound and the water in admixture with one another and sometimes with a volatile organic blowing agent such as trichlorofluoromethane and suitable catalysts and cell regulating agents. The ingredients are preferably blended with one another in the mixing head or chamber of a polyurethane foam machine wherein separate streams of, for example, (1) a mixture of the polyether polyol, the volatile organic blowing agent and the hydroxyl-containing compound, (2) the isocyanate, and (3) the water, cell regulator and amine and tin catalysts are rapidly blended into a homogeneous mixture and is discharged into a suitable mold or trough wherein it is allowed to foam and cure to a cellular product.

It is important to employ the hydroxyl containing compound having an OH equivalent weight between 74 and 150 in amount corresponding to from 0.01 to 0.90 OH equivalent per chemical equivalent weight of water in the mixture in order to obtain soft, flexible foams having low load bearing properties while retaining good tensile strength, elongation and resiliency, and a good hand.

The following examples illustrate ways in which the principle of the invention has been applied, but are not to be construed as limiting its scope.

EXAMPLE 1

A polyurethane foam was prepared employing the recipe:

| Ingredient: | Parts by weight |
|---|---|
| Polyether polyol [1] | 96 |
| Monomethyl ether of propylene glycol | 4 |
| Water | 2 |
| Tolylene diisocyanate | [2] Index 105 |
| Trichlorofluoromethane | 4 |
| Triethylenediamine | 0.10 |
| N-ethylmorpholine | 0.20 |
| Stannous octoate | 0.10 |
| Silicone L-520 | 1.3 |

[1] The condensate of propylene oxide with glycerine to form a polyether polyol having an average equivalent weight of 1000.

[2] The polyisocyanate is used in amount corresponding to 1.05 NCO groups per equivalent OH group in the sum of the polyether polyol, the hydroxyl containing compound and the water in the recipe.

The ingredients were blended in the mixing head of a foam machine and were discharged therefrom as a homogeneous mixture into an open container wherein it was allowed to foam and cure under ambient conditions. After 24 hours, test pieces were cut from the foam bun and were used to determine properties for the foam employing procedures similar to those described in ASTM D-1564-61T, and are reported under the heading A below.

For purpose of comparison, a foam was prepared from another portion of the same batch of the polyether polyol, except using 100 parts of said polyol in place of the 96 parts of said polyol and the 4 parts of monomethyl ether of propylene glycol used in the preceding experiment. The properties of this foam are reported under the heading B.

|  | A | B |
|---|---|---|
| Density, lbs./cu. ft | 2.35 | 2.48 |
| Tensile strength, lbs./sq. in | 8.1 | 8.3 |
| Elongation, percent | 240 | 127 |
| Resiliency | 40 | 58 |
| Compression set, percent | 5.9 | 2.3 |
| 4" ILD 25% | 16 | 30 |
| Tear resistance | 1.6 | 0.8 |

The foam A was an unusually soft, open-cell porous, flexible, polyether urethane foam having a low ILD value.

We claim:

1. A process for making a soft, flexible polyether urethane foam which comprises reacting (1) a polyether polyol consisting of the condensate of propylene oxide and glycerine, which polyether polyol has an OH equivalent weight of from 800 to 1500 in admixture with (A) from 1.8 to 5 parts by weight of water per 100 parts by weight of said polyether polyol and (B) a compound selected from the group consisting of mono-alkyl ethers of ethylene glycol, propylene glycol, hexane triol, glycerine, and trimethylolpropane which ethers each have at least one hydroxyl group in the molecule and have an OH equivalent weight of from 74 to 150 and are used in an amount corresponding to from 0.01 to 0.90 hydroxyl equivalent per chemical equivalent of water, with (2) a polyisocyanate in an amount corresponding to from about 1 to 1.15 chemically equivalent NCO group for each reactive hydrogen in the mixture of the ingredients.

2. A process as claimed in claim 1, wherein the compound B is mono-methyl ether of propylene glycol.

References Cited

UNITED STATES PATENTS

| 3,055,850 | 9/1962 | Worsley et al. | 260—2.5 |
| 3,178,300 | 4/1965 | Gemeinhardt et al. | 260—2.5 |
| 3,245,957 | 4/1966 | Hindersinn et al. | 260—2.5 |
| 3,294,713 | 11/1966 | Stallings et al. | 260—2.5 |
| 3,294,713 | 12/1966 | Hudson et al. | 260—2.5 |

OTHER REFERENCES

Dwyer et al.: "Technology of Super Soft Flexible Urethane Foam," Modern Plastics, May 1964, pp. 139, 140, 143, 144, 146, 148, 183 and 185.

DONALD E. CZAJA, *Primary Examiner.*

H. C. COCKERAM, *Assistant Examiner.*